(12) United States Patent
Au et al.

(10) Patent No.: US 11,954,515 B1
(45) Date of Patent: Apr. 9, 2024

(54) MANAGING SIGNALS FROM MULTIPLE VIRTUAL MACHINES AND CONTROLLING HARDWARE DIRECTLY OR THROUGH AN API BY A HOST OPERATING SYSTEM

(71) Applicant: Google LLC, Mountain View, CA (US)

(72) Inventors: Wing-Yee Au, Saratoga, CA (US); Alan Rowe, San Jose, CA (US); Sameer Narkhede, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/699,884

(22) Filed: Mar. 21, 2022

Related U.S. Application Data

(63) Continuation of application No. 15/930,346, filed on May 12, 2020, now Pat. No. 11,288,085, which is a continuation of application No. 16/127,306, filed on Sep. 11, 2018, now Pat. No. 10,649,804, which is a continuation of application No. 15/156,683, filed on May 17, 2016, now Pat. No. 10,073,712, which is a continuation of application No. 12/854,694, filed on Aug. 11, 2010, now Pat. No. 9,342,335.

(60) Provisional application No. 61/289,957, filed on Dec. 23, 2009.

(51) Int. Cl.
*G06F 9/455* (2018.01)

(52) U.S. Cl.
CPC ...... *G06F 9/45558* (2013.01); *G06F 9/45533* (2013.01); *G06F 2009/45595* (2013.01)

(58) Field of Classification Search
CPC ............ G06F 9/45558; G06F 9/45533; G06F 2009/45595
See application file for complete search history.

(56) References Cited

U.S. PATENT DOCUMENTS

| | | | |
|---|---|---|---|
| 7,757,231 B2 | 7/2010 | Anderson et al. | |
| 2005/0132365 A1 | 6/2005 | Madukkarumukumana et al. | |
| 2005/0204357 A1* | 9/2005 | Garg | G06F 9/4486 718/1 |
| 2005/0268336 A1* | 12/2005 | Finnegan | G06F 21/31 714/E11.207 |
| 2006/0005186 A1 | 1/2006 | Neil | |
| 2006/0064697 A1* | 3/2006 | Kagi | G06F 9/5011 718/103 |
| 2006/0085792 A1 | 4/2006 | Traut | |
| 2006/0089992 A1* | 4/2006 | Blaho | G06F 9/548 709/227 |
| 2006/0146057 A1 | 7/2006 | Blythe | |
| 2007/0055837 A1* | 3/2007 | Rajagopal | G06F 12/1475 711/163 |
| 2007/0168525 A1* | 7/2007 | DeLeon, III | G06F 9/4812 709/228 |

(Continued)

OTHER PUBLICATIONS

Bach, Linux Enterprise 10 (Including XEN), 2006-2008, pp. 1-170.

*Primary Examiner* — Michael W Ayers

(74) *Attorney, Agent, or Firm* — Lerner David LLP

(57) ABSTRACT

A system according to an embodiment of the present invention includes at least two virtual machines running on a hardware platform using either a hosted or a bare metal hypervisor. The virtual machines may communicate with an agent-server resident in the host operating system or in one of the virtual machines to switch control of the hardware component, such as graphics hardware, from one virtual machine to another.

9 Claims, 4 Drawing Sheets

(56) References Cited

U.S. PATENT DOCUMENTS

| | | |
|---|---|---|
| 2007/0226704 A1 | 9/2007 | Nichols |
| 2008/0140824 A1* | 6/2008 | Jain .................... H04L 43/0811 |
| | | 709/224 |
| 2008/0196043 A1 | 8/2008 | Feinleib et al. |
| 2008/0244155 A1* | 10/2008 | Lee .................... G06F 12/1491 |
| | | 711/6 |
| 2008/0320583 A1 | 12/2008 | Sharma et al. |
| 2009/0204964 A1 | 8/2009 | Foley et al. |
| 2010/0017801 A1 | 1/2010 | Kundapur |
| 2010/0030983 A1 | 2/2010 | Gupta et al. |
| 2010/0169884 A1* | 7/2010 | Bogin ................ G06F 9/45533 |
| | | 718/1 |
| 2010/0199351 A1 | 8/2010 | Protas |
| 2010/0223397 A1 | 9/2010 | Elzur |
| 2010/0262722 A1 | 10/2010 | Vauthier et al. |
| 2010/0262794 A1 | 10/2010 | Beer et al. |
| 2010/0269109 A1 | 10/2010 | Cartales |
| 2011/0134111 A1* | 6/2011 | Stone ................ G06F 9/45541 |
| | | 345/419 |
| 2015/0029200 A1 | 1/2015 | Khosa et al. |

\* cited by examiner

MANAGING SIGNALS FROM MULTIPLE VIRTUAL MACHINES AND CONTROLLING HARDWARE DIRECTLY OR THROUGH AN API BY A HOST OPERATING SYSTEM

CROSS-REFERENCE TO RELATED APPLICATIONS

The present application is a continuation of U.S. patent application Ser. No. 15/930,346, filed May 12, 2020, which is a continuation of U.S. patent application Ser. No. 16/127,306, filed Sep. 11, 2018, and issued as U.S. Pat. No. 10,649,804 on May 12, 2020, which is a continuation of U.S. patent application Ser. No. 15/156,683, filed May 17, 2016, and issued as U.S. Pat. No. 10,073,712 on Sep. 11, 2018, which is a continuation of U.S. patent Ser. No. 12/854,694, filed Aug. 11, 2010, and issued as U.S. Pat. No. 9,342,335 on May 17, 2016, which claims the benefit of the filing date of U.S. Provisional Patent Application No. 61/289,957 filed Dec. 23, 2009, the disclosure of which is incorporated herein by reference

TECHNICAL FIELD

Embodiments of the invention relate to the virtualization of computer hardware, and to systems, methods, and computer program products for controlling the use of multiple virtual computer machines.

BACKGROUND OF THE INVENTION

Virtualization of computer hardware may be used to increase the functionally of a given computer system. Different virtual machines may make use of the same hardware platform while operating as separate machines running their own operating system of either the same type, such as two instances of Windows, or different types, such as Windows and Linux.

To implement one or more virtual machines, a hypervisor may be implemented to facilitate communication between the hardware and the virtual machines. A hypervisor generally provides abstraction for controls necessary to operate a given hardware platform, which may include aspects like interrupts, central processing unit (CPU) scheduling, register allocation, BIOS control, and graphical display control. The hypervisor then facilitates communication between an operating system instance running in a virtual machine and the hardware platform. One type of hypervisor is referred to as a bare metal hypervisor. In a bare metal hypervisor, the hypervisor itself may directly control the hardware platform. The bare metal hypervisor may be implemented using a basic embedded operating system run the by the hypervisor itself. Another type of hypervisor facilitates communication between one or more operating system instances running on virtual machines and a host operating system. The hypervisor may facilitate communication between the virtual machines and the host operating system, which in turn controls the hardware platform.

Hardware virtualization may allow for a variety of advantages—including the need to purchase only a single hardware platform while running multiple seemingly separate machines. Each virtual machine may operate a different operating system, allowing one hardware platform to execute potentially incompatible applications, as one runs in the operating system of one virtual machine, and a second in the different operating system of another virtual machine.

While virtualization may have the potential to bring about advantages, in practice in may be difficult to manage the control of hardware components by multiple different virtual machines.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known computer system components, circuits, control signals, timing protocols, and software operations have not been shown in detail in order to avoid unnecessarily obscuring the described embodiments of the invention.

Figure 1:
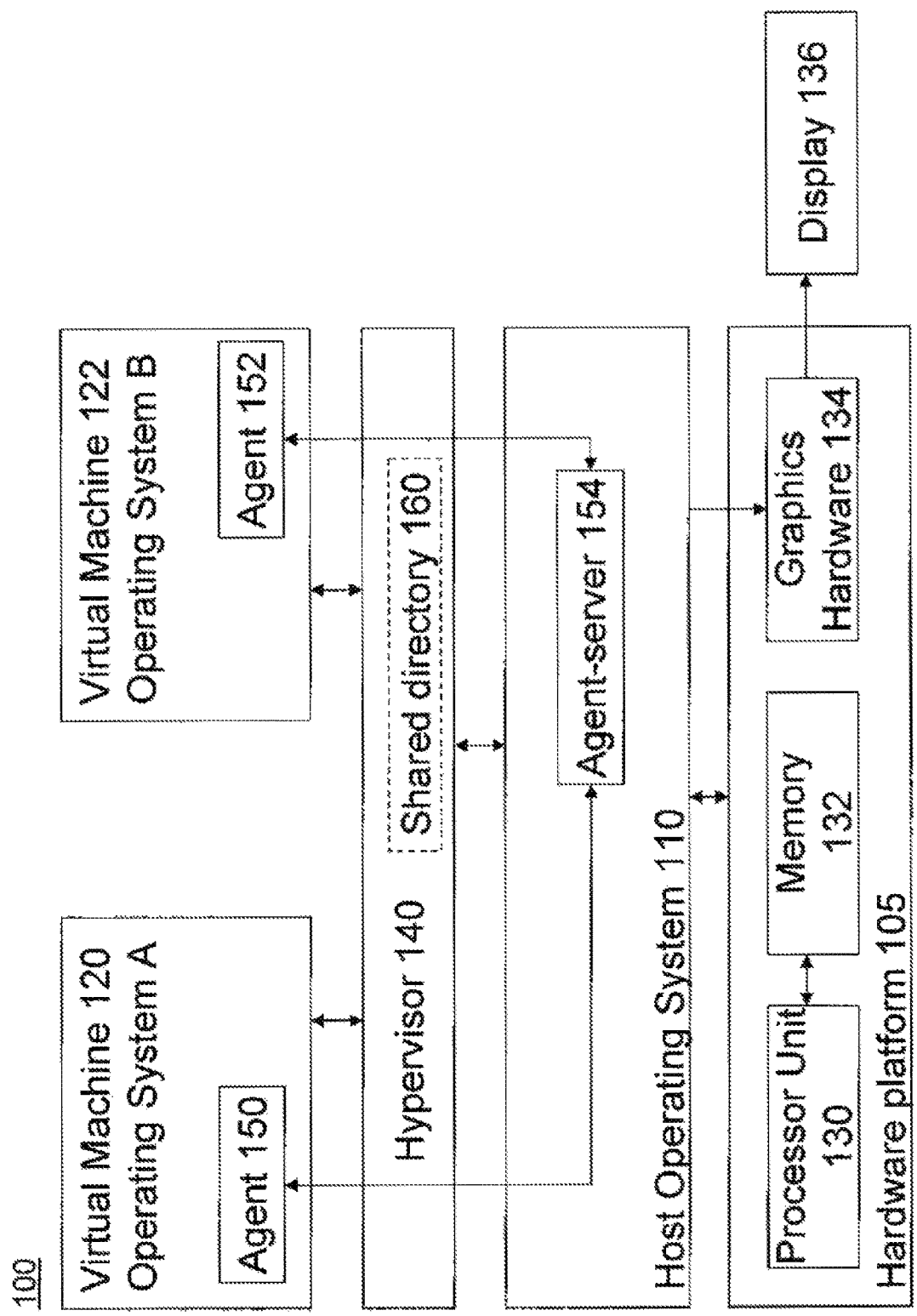
FIG. 1 is a schematic illustration of a computing system according to an embodiment of the present invention.

FIG. 1 is a schematic illustration of a computing system 100 according to an embodiment of the present invention. The system of FIG. 1 may be referred to as a hosted hypervisor system in that the system 100 includes virtual machines 120 and 122 which interface through the hypervisor 140 to a host operating system 110. The host operating system 110 in turn controls the hardware platform 105. The computing system 100 includes a hardware platform 105. As was generally described above, virtualization may allow the hardware platform 105 to be utilized by a host operating system 110 as well as a virtual machine 120. Although two virtual machines are shown in FIG. 1, any number may generally be used. The hardware platform 105 includes a processor unit 130 and a memory 132. Although shown in single boxes in FIG. 1, the processor unit 130 may include multiple processor devices, including for example a dual core processor. Similarly, the memory 132 may be implemented using any combination of memory or other storage devices.

The memory 132 may be encoded with computer readable instructions that allow the processor unit 130 to implement the host operating system 110 and virtual machines 120 and 122. In this manner, the hardware platform 105 may run the host operating system as well as any operating systems running in the virtual machines 120 and 122, illustrated respectively as operating systems A and B in FIG. 1. Although illustrated as separate operating systems, the host operating system and operating systems A and B may be any combination of different operating systems or different instances of a same operating system. Any operating system may be used including, but not limited to any Windows or Linux operating system.

The hardware platform 105 may include other hardware used by the host operating system 110 and the virtual machines 120 and 122. For example, graphics hardware 134 is shown in FIG. 1 and controls a display 136. Other hardware may also be included, for example additional processor units, additional memory, a USB interface, any other hardware or interface for controlling a peripheral or other device, and any combinations of these.

In the embodiment of FIG. 1, the graphics hardware 134 is controlled by the host operating system 110. That is, the host operating system 110 sends electronic signals, such as the issuance of commands and transmission of data, to the graphics hardware 134 in accordance with the operation of the host operating system 110. In other embodiments, the host operating system 110 may not control hardware components directly but may utilize a third party application programming interface (API) to control hardware components. As was described above, the virtual machine 120 may communicate with the graphics hardware 134 by interacting with a hypervisor 140. The hypervisor 140 is generally a software layer that may also be implemented by the processor unit 130 and memory 132. That is, the memory 132 may be encoded with computer readable instructions that cause the processor unit 130 to implement the hypervisor 140. Examples of commercially available hypervisors include, but are not limited to, VMWare, Xen, and hyperV. The hypervisor 140 receives input from the virtual machine 120, which may include for example commands, data or other electronic signals intended to control the graphics hardware 134, such as commands and data to be displayed on the display 136. The hypervisor 140 may then facilitate communication of the input from the virtual machine 120 to the host operating system 110. For example, the hypervisor 140 may reformulate the data or commands from the virtual machine 120 running operating system A into a format suitable for use with the host operating system 110.

In the embodiment of FIG. 1, the hypervisor 140 further receives input from the virtual machine 122 running operating system B. The input may include data, commands, or both, intended for the graphics hardware 134 to control the display 136. The hypervisor 140 may also facilitate communication between the virtual machine 122 and the host operating system 110. To facilitate communication between the two virtual machines 120 and 122 and the host operating system 110, the hypervisor 140 may for example store graphics data from the virtual machine 120 into one buffer (not shown) of the hardware platform 105 and graphics data from the virtual machine 122 into a different buffer (not shown) of the platform 105. The buffers may be stored in the memory 132 or other storage of the platform 105. The host operating system 110 then controls when and how data from the two buffers are rendered on the display 136 by the graphics hardware 134. It can be difficult for an end user, who may be working with an application hosted by the virtual machine 120 or 122 to easily and efficiently control the data that is ultimately displayed on the display 136. Access to and manipulation of the hypervisor 140 directly can be difficult or impossible.

The computer system 100 provides another mechanism for the virtual machines 120 and 122 to communicate with the host operating system 110. An agent 150 is implemented in the operating system A of the virtual machine 120 while an agent 152 is implemented in the operating system B of the virtual machine 122. The agents 150 and 152 may each be a software program running in the respective virtual machine, and the software for the agents 150 and 152 may be encoded along with the virtual machine in the memory 132 and executed by the processor unit 130. In some embodiments, some of the virtual machines may not include an agent.

An agent-server is implemented in the host operating system 110. The agent-server 154 may be implemented as a software program which may also be encoded in the memory 132 and executed by the processor unit 130. As will be described further below, the agents 150 and 152 may present a user of the respective virtual machine 120 or 122 with a list of virtual machines in the system 100. On receipt of a selection by the user, the agents 150 and 152 may communicate with the agent-server 154 to have the agent-server 154 issue commands in the host operating system 110 to control the graphics hardware 134 in accordance with the request. In this manner, the agents 150 and 152 and agent-server 154 may provide a communication path that may be supported by, but may be independent of, the hypervisor 140. While the hypervisor 140 may receive data and commands generated by the virtual machines 120 and 122 for the hardware platform 105, the agent-server may control what received data is ultimately rendered by the graphics hardware 134 on the display 136.

Communication between the agent 150 and the agent-server 154 and communication between the agent 152 and the agent-server 154 may occur over a virtualized Ethernet or other network implemented by the hypervisor 140 using internet protocol (IP) addresses of the agents 150 and 152 and agent-server 154. The hypervisor 140 may implement a shared directory 160 containing the current IP address associated with system components including the agents 150 and 152 and the agent-server 154. In this manner the agents 150 and 152 may poll the shared directory 160 to ensure any messages sent to the agent-server 154 are sent to the correct IP address. Other communication mechanisms may also be used.

Figure 2:
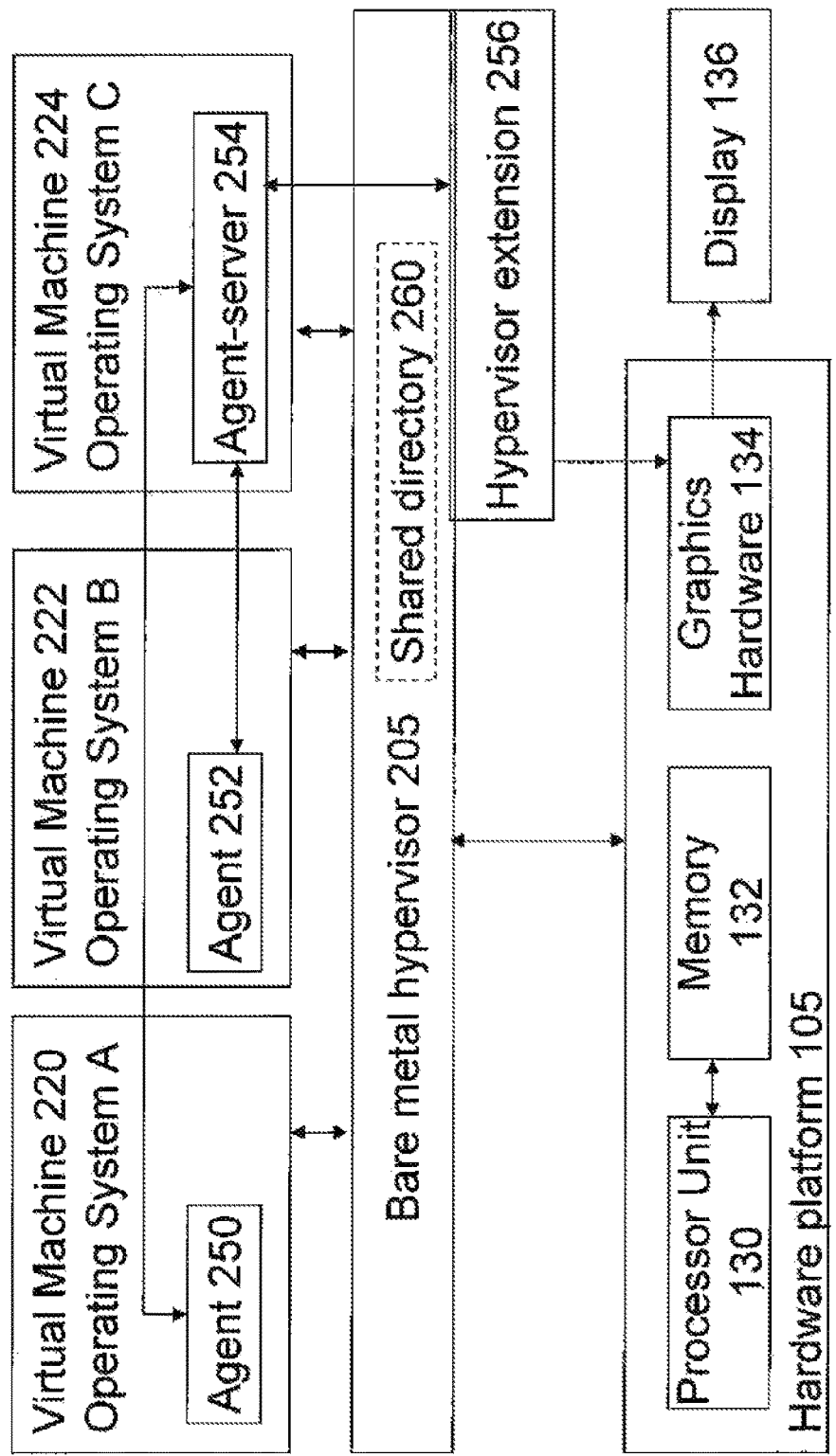
FIG. 2 is a schematic illustration of a computing system according to an embodiment of the present invention including a bare metal hypervisor.

A system 200 is shown in FIG. 2 using a bare metal hypervisor 205. In FIG. 2, the bare metal hypervisor 205 directly controls the hardware platform 105 and no host operating system may be present. The bare metal hypervisor 205 may be implemented using an embedded operating system. The bare metal hypervisor 205 may be implemented in software including computer readable instructions stored on the memory 132 and executed by the processor unit 130. Virtual machines 220, 222, and 224 each operate using a respective operating system A, B, and C. As with the system 100 of FIG. 1, the virtual machines 220, 222, and 224 may run different operating systems, different instances of the same operating system, or combinations of such operating systems. The virtual machines 220, 222, and 224 interface with the hardware platform 105 through the bare metal hypervisor 205.

The virtual machine 220 may include an agent 250. The agent 250 may be implemented in software that may be included in the software for the virtual machine 200. The software for the agent 250 may include computer readable instructions encoded on the memory 132 and executed by the processor unit 130. The agent 250 may be invoked by a user of the virtual machine 220, and the agent 250 may present a list of other virtual machines in the system 200 to the user. On selection of a virtual machine, the agent 250 communicates with an agent-server 254 that is running on another virtual machine in the system 200, for example virtual machine 224 shown in FIG. 2. Similarly, the agent 252 may communicate with the agent-server 254 requests made in the virtual machine 222. The agent-server 254 may then control which virtual machine's commands control a particular hardware component, such as the graphics hardware 134. The agent-server 254 may communicate with the graphics hardware through a hypervisor extension 256.

Communication between the agents 250 and 252 and the agent-server 254 may occur using a virtualized Ethernet implemented by the bare metal hypervisor 205. Other communication mechanisms may be used in addition or instead of virtualized Ethernet. To communicate via Ethernet, the agents 250 and 252 may send commands to the IP address of the agent-server 254. The IP address of the agent-server 254 may be stored in a shared directory 260 implemented by the bare metal hypervisor 205. The agents 250 and 252 may poll the shared directory 260 to ensure communications destined for the agent-server 254 are sent to the correct IP address.

Embodiments of systems according to the present invention have been described above. It is to be understood that the physical configuration of the systems may be flexible, in that all or portions of the described systems may be distributed across multiple pieces of hardware. Also, the descriptions provided above included graphics hardware in the hardware platform, but it is to be understood that systems according to the present invention may have other or additional hardware components controlled by the agents and agent-servers described herein. References to the graphics hardware are by way of example of a component that may advantageously be controlled according to embodiments of the invention. Also, agents and agent-servers have been described above as independent of hypervisors. This may be advantageous where software is not desired to depend on a particular hypervisor implementation. However, in other examples, the agent-server may be implemented in the hypervisor or as a hypervisor extension.

Figure 3:
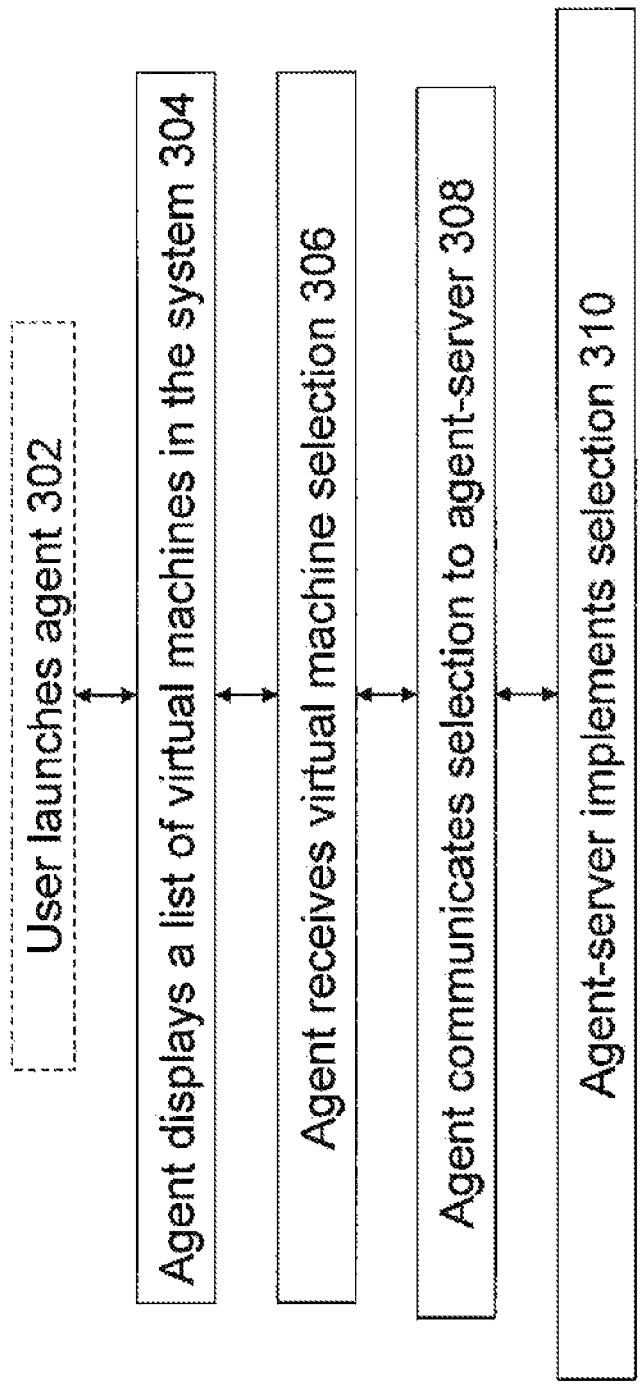
FIG. 3 is a flowchart of a method that may be implemented by the computing system of FIG. 1 or FIG. 2.

Methods implemented by systems according to embodiments of the present invention will now be described. FIG. 3 is a flowchart illustrating a method that may be implemented by the system 100 of FIG. 1 or the system 200 of FIG. 2 according to embodiments of the present invention. In block 302, a user launches an agent. The user may be an actual computer system human user, or may be another electronic process in communication with the system implementing the method of FIG. 3. The display 136 may be controlled by the virtual machine 120 and displaying data generated by the virtual machine 120 (see FIG. 1). For example, although not shown in FIG. 1, the virtual machine 120 may run a video surveillance application and the virtual machine 120 may be coupled to one or more video cameras. The display 136 may display a full-screen image of video surveillance data collected from one or more video cameras coupled to the virtual machine 120. If a user wants to view data from another virtual machine, the user may launch the agent 150. The agent may be launched in a variety of manners, and advantageously in a manner understandable by a user to launch a program. For example, the agent may be launched by selecting an icon associated with the agent, or selecting an icon in a system tray of the operating system. Since the agent 150 is running in the operating system of the virtual machine 120, it may be launched in a manner typically used to launch applications in the operating system of the virtual machine 120. In a similar manner, a user may launch the agent 152 in the virtual machine 122. With reference to FIG. 2, the user may launch the agent 250 in the virtual machine 220 or the agent 252 in the virtual machine 222. Alternatively, the agent may always be running, and a user interface associated with the agent may be minimized and accessible via an icon in the system tray or other manner.

As illustrated in block 304 of FIG. 3, the agent may display a list of virtual machines in the system. The agent may obtain the list by communicating with the agent-server in the system. So, for example, referring back to FIG. 1, the agent 150 may obtain a list of the other virtual machines in the system. In the example of FIG. 1, that would include just the virtual machine 122. The list may be obtained by communicating with the agent-server 154. The requesting virtual machine may or may not be included on the list returned by the agent-server 154. In the example of FIG. 2, the agent 250 may obtain a list of other virtual machines in the system, including the virtual machines 222 and 224, by communicating with the agent-server 254. The communication between the agents and the agent-server may occur in any manner, including over a virtualized Ethernet made available by the hypervisor. Each agent and the agent-server is assigned an IP address and the IP addresses is stored and updated in a shared directory maintained by the hypervisor, as described above. In this manner, the agents may obtain a list of including other virtual machines in the system without communicating directly with the other virtual machines. Further, in this manner, the communication between the agents and the agent-server, while it may take advantage of infrastructure provided by the hypervisor, is independent of the hypervisor implementation used.

On receipt of the list of virtual machines in the system, the agent may display the list. In the example of FIG. 1, the agent 150 may generate display data that is communicated by the virtual machine 120 through the hypervisor 140 to the host operating system 110 to the graphics hardware 134 and rendered on the display 136. The agent 152 may function in an analogous manner. In the example of FIG. 2, the agent 250 may generate display data that is communicated by the virtual machine 220 through the bare metal hypervisor 205 to the graphics hardware 134 and rendered on the display 136. In this manner, an end user may view a list of virtual machines in the system, and may make a selection from the list to select a virtual machine to control a hardware component, such as the graphics hardware in the hardware platform of the system. The agent receives the virtual machine selection in block 306, as illustrated in FIG. 3.

To pass control of the hardware component to the selected virtual machine, the agent communications the selection to the agent-server of the system in block 308. In the embodiment of FIG. 1, the agent 150 for example may issue a command to the agent-server 154 to pass control of the graphics hardware 134 to the virtual machine 122. In the embodiment of FIG. 2, the agent 250 for example may issue a command to the agent-server 254 to pass control of the graphics hardware 134 to the virtual machine 222 or 224. It is to be understood that control of other hardware components may also be changed in this manner. In particular, when control of graphics hardware is passed from one virtual machine to another, control of other components such as a keyboard and mouse or other input devices may also be passed to the virtual machine placed in control of the graphics hardware.

Once the agent-server receives the selection, the agent-server may implement the selection, as shown in block 310 of FIG. 3. The implementation of the selection may vary in accordance with the system used. When the agent-server is implemented in a host operating system, such as in the embodiment of FIG. 1, the agent-server 154 may issue a host operating system command to display data from the selected virtual machine, for example by issuing a command to maximize a window of the operating system associated with the selected virtual machine. Other windows may be minimized. When the agent-server is implemented with a bare metal hypervisor, such as in the embodiment of FIG. 2, the agent-server 254 may issue a command to the hypervisor 205 or the hypervisor extension to issue an appropriate command to change control of the hardware component in accordance with the selection, such as by maximizing a window associated with the selected virtual machine.

The method of FIG. 3 has been described with reference to switching control of a hardware component, such as graphics hardware, between virtual machines in a system. However, the method may also be used to switch control of the hardware component to an administrative console. Managing a system including virtual machines, such as the system 100 of FIG. 1 or the system 200 of FIG. 2 may also involve a variety of administrative functions or controls, including for example controls to start or stop one or more of the virtual machines, change parameters for one or more of the virtual machines, or monitor the states of one or more of the virtual machines. Configuring a virtual machine may be implemented by creating or modifying one or more configuration files useable by the hypervisor in the system. Starting or stopping a virtual machine may be implemented by starting or stopping one or more processes of the system's hypervisor. An administrative console may be provided for this purpose and may be implemented by the host operating system 110 of FIG. 1 or the bare metal hypervisor 205 of FIG. 2. The agent-server in the system may include the administrative console as an option along with the list of virtual machines in the system when the list is sent to an agent. A user may then select the administrative console as an option, and the agent-server may issue an appropriate command to transfer control of a hardware component, such as graphics hardware, to the administrative console. In the embodiment of FIG. 1, the agent-server may issue a command in the host operating system 110 to minimize all windows such that the administrative console is visible.

A use of the system of FIG. 1 in the context of video surveillance will now be described with reference to FIG. 4, a schematic illustration of multiple video cameras coupled to the system 100 of FIG. 1. Hardware virtualization in a video surveillance system may allow security practitioners to consolidate multiple video surveillance systems on a single hardware platform. Using embodiments of the present invention, different virtual machines may share same physical resources, work around logical limits (such as a limit on a number of supported cameras) and migrate cameras or storage between possibly incompatible software versions. The virtual machine 120 may run a video surveillance application 410 in the operating system A. The video surveillance application 410 may receive data from cameras 414 and 416. The virtual machine 122 may run a video surveillance application 412 in the operating system B. The video surveillance application 412 may receive data from a camera 418. Note that, in this manner, the system 100 may support incompatible video surveillance applications. For example, the video surveillance application 410 may be running in a Windows operating system while the video surveillance application 412 may be running in a Linux operating system, and yet the systems are implemented on the same hardware platform 105. Further, note that hardware limitations of the application 410 or 412 may be exceeded by the system 100. For example, the application 410 may have a restriction that only two cameras are supported. The system 100 may nonetheless support an additional camera by providing another instance of the application as the application 412 and connecting the camera 418.

Video surveillance data may advantageously be displayed in full screen mode by the display 136. Full screen mode may be preferred in some video surveillance applications to maximize screen real estate and display as many large sized high resolution camera feeds simultaneously as possible. Accordingly, embodiments of the present invention may be particularly advantageous for video surveillance applications to switch full screen control of the display 136 between the applications 410 and 412. This may represent an improvement over systems having control of an administrative console and virtual systems in a tiled window display that may limit screen real estate available for the application, and over overlapped windows which also may make point-and-click or selection access more difficult.

Figure 4:
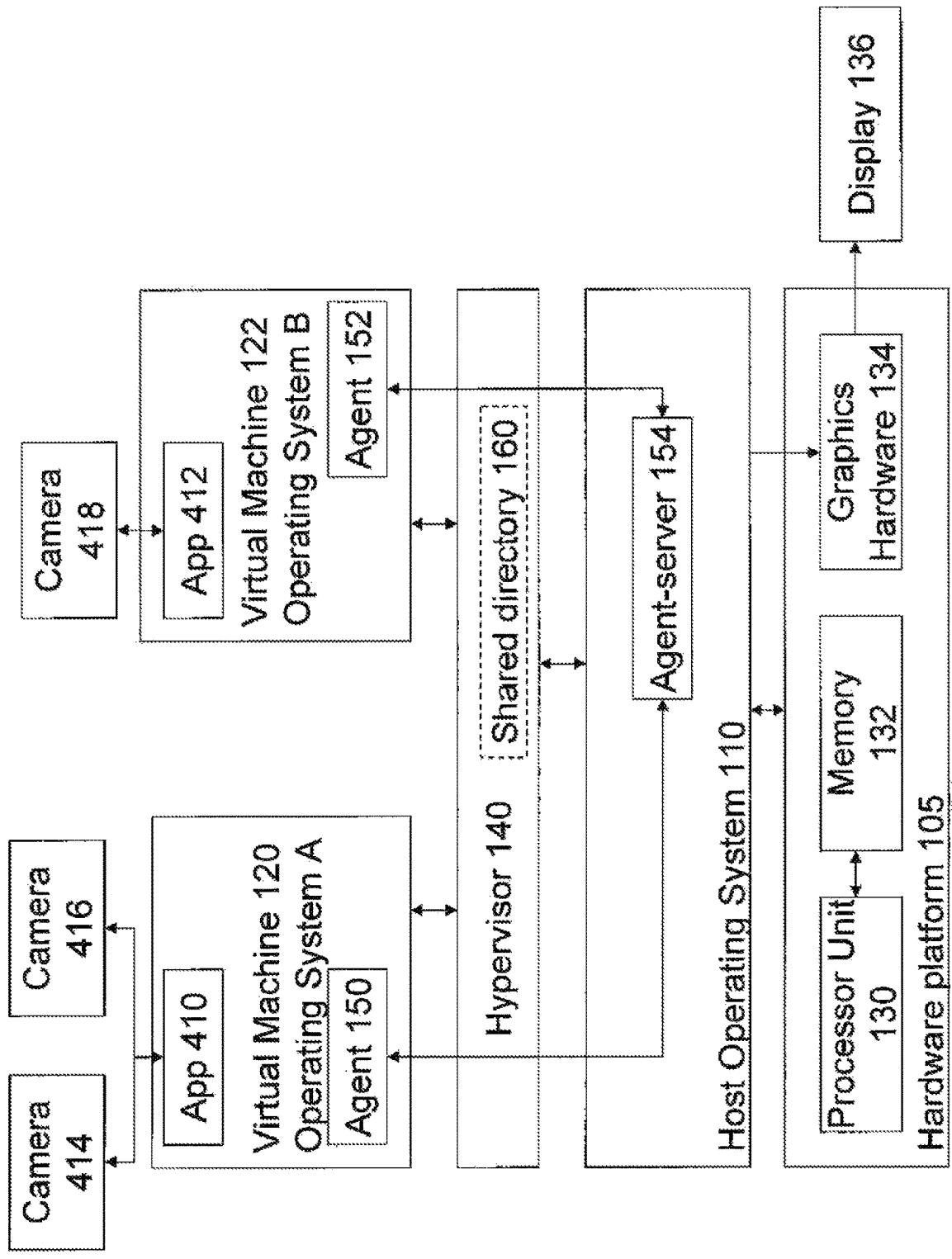
FIG. 4 is a schematic illustration of the use of the computing system of FIG. 1 as a video surveillance system.

The system of FIG. 4 may also advantageously be used to transfer cameras gracefully from one system to another. For example, a system operator may desire to switch from the application 410 to the application 412, however it may be difficult, time consuming, or risky to switch all cameras in a video surveillance system at once. Accordingly, the system of FIG. 4 may be used to run the legacy application and a new application simultaneously. Cameras may then be transferred from one application to another one at a time, or otherwise in groups. For example, the camera 416 may be decoupled from the application 410 and coupled to the application 412. Once operation is satisfactorily established, the camera 414 may be transferred to the application 412. After all cameras are transferred, the virtual machine 120 may optionally be stopped. This allows a system administrator to reduce downtime and continue to utilize video data from the remaining cameras as one is transferred to a new program.

Embodiments of the present invention may provide a variety of advantages. Advantages descried herein are provided for explanatory purposes, and are not intended to be limiting. Not every embodiment of the present invention may exhibit all or even any of the advantages described. Embodiments of the present invention utilize agents running in the operating systems of the virtual machines, and an agent-server running either in a host operating system or in one of the virtual machines in the case of a bare metal hypervisor. The agent interface may appear to a user of the virtual machine in a manner the user is accustomed to in that operating system, such as an icon in a system tray. This may be advantageous over systems that are provided by the hypervisor itself and that are therefore external to the operating system of the virtual machine. If external to the virtual machine's operating system, the interface may be a special key sequence or mouse movement which may not be intuitive to the user, and may accordingly be difficult or prohibitive to use. Any special key sequence needed to manipulate an interface provided by the hypervisor may also be mixed-up with key sequences used by the operating system of a virtual machine, leading to a conflict in the system and confusion by the user. Further more, embodiments of agents and agent-servers described above are generally independent of hypervisor implementation and extensible both to hosted and bare metal hypervisors.

Embodiments of the present invention may also find use in cloud computing systems, where a number of virtual machines may be implemented on a hardware platform, which may be a distributed hardware platform. Cloud computing systems may make use of a bare metal hypervisor, as was depicted in FIG. 2. Embodiments of the agents and agent-servers described herein may be used to facilitate changing control of one or more particular hardware components in a cloud computing system from one virtual machine to another. Such functionality may be used, for example, to administer the cloud computing system.

From the foregoing it will be appreciated that, although specific embodiments of the invention have been described herein for purposes of illustration, various modifications may be made without deviating from the spirit and scope of the invention.

The invention claimed is:

1. A system, comprising:
   a hardware component;
   a first virtual machine including computer readable instructions that when executed cause a processing unit to run a first operating system instance;
   a second virtual machine including computer readable instructions that when executed cause the processing unit to run a second operating system instance;
   at least one agent adapted to be invoked by the first or second virtual machine;
   a hypervisor communicatively coupled with the first and second virtual machines via a first communication path; and
   an agent-server executable by a processor to communicate with the at least one agent and to control commands received from one of the first or second virtual machines for controlling the hardware component;
   wherein at least one of the first operating system instance and the second operating system instance control the hardware component; and
   wherein an IP address of the agent-server is stored in a shared directory implemented by the hypervisor.

2. The system of claim 1, wherein the hardware component is a graphics processing unit.

3. The system of claim 1, wherein the agent-server communicates with the hardware component through a hypervisor extension.

4. The system of claim 1, wherein the hypervisor is a bare metal hypervisor.

5. The system of claim 4, wherein the bare metal hypervisor is implemented in software including computer readable instructions stored on memory and executed by a processor.

6. The system of claim 1, wherein the first virtual machine and second virtual machine run different operating systems.

7. The system of claim 1, wherein the agent is implemented in software for the first virtual machine.

8. The system of claim 1, wherein the agent and the agent-server communicate via the hypervisor.

9. The system of claim 8, wherein the agent and the agent-server communicate using a virtualized Ethernet implemented by the hypervisor.

* * * * *